(12) United States Patent
Chang et al.

(10) Patent No.: US 6,888,701 B2
(45) Date of Patent: May 3, 2005

(54) ENHANCED TWIST ADJUST RANGE WITH SCRIBED LINES FOR SLIDER CURVATURE ADJUST

(75) Inventors: Ping-Wei Chang, San Jose, CA (US); Chie Ching Poon, San Jose, CA (US); Andrew C. Tam, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 86 days.

(21) Appl. No.: 09/916,856

(22) Filed: Jul. 27, 2001

(65) Prior Publication Data

US 2003/0021068 A1 Jan. 30, 2003

(51) Int. Cl.$^7$ .............................. G11B 5/127; G11B 5/60; H04R 31/00; B23K 26/00
(52) U.S. Cl. ................................ 360/234.3; 29/603.09; 264/400; 264/482; 264/40.1
(58) Field of Search ............................. 360/234.3, 235.4; 219/121.69, 121.68, 121.73, 121.83; 451/5, 57; 29/603.12, 603.16, 603.17, 603.18, 603.09, 603.1, 407.01, 407.05, 593, 898.13; 356/601; 264/400, 482, 40.1

(56) References Cited

U.S. PATENT DOCUMENTS

| | | | |
|---|---|---|---|
| 5,266,769 A | 11/1993 | Deshpande et al. | |
| 5,442,850 A | 8/1995 | Kerth | |
| 5,687,042 A | 11/1997 | Chhabra et al. | |
| 5,713,123 A | 2/1998 | Toyoda et al. | |
| 5,982,583 A | 11/1999 | Strom | |
| 6,075,604 A | 6/2000 | Crawforth et al. | |
| 6,107,599 A | 8/2000 | Baumgart et al. | |
| 6,108,170 A | 8/2000 | Crawforth et al. | |
| 6,288,873 B1 * | 9/2001 | Lundquist et al. | ....... 360/234.6 |
| 6,295,719 B1 * | 10/2001 | Strom | ..................... 29/603.12 |
| 6,321,440 B1 | 11/2001 | Crawforth et al. | |
| 6,441,385 B1 * | 8/2002 | Khlif | ........................... 250/548 |
| 6,548,009 B1 * | 4/2003 | Khlif et al. | ................. 264/400 |
| 6,631,548 B2 * | 10/2003 | Chang et al. | ............ 29/603.09 |

(Continued)

OTHER PUBLICATIONS

U.S. patent application Ser. No. 09/277,862, filed on Mar. 26, 1999, entitled, "Method For Manufacture of Sliders", invented by Yu–En Percy Chang; Yuri Igor Markevitch; and Scott Thomas.

(Continued)

*Primary Examiner*—William Klimowicz
(74) *Attorney, Agent, or Firm*—Konrad, Raynes & Victor, LLP; Alan S. Raynes

(57) ABSTRACT

Embodiments include a method for adjusting the twist of an air bearing surface of at least one slider to substantially match a target values for twist, the at least one slider having a back surface opposite the air bearing surface, the back surface including two sets of diagonally opposite corner regions, with each set including one corner region adjacent to a leading edge of the slider and one corner region adjacent to a trailing edge of the slider. The method includes forming a first mechanical scribe on the back surface extending through at least a portion of the corner regions adjacent to the leading edge of the slider and forming a second mechanical scribe on the back surface extending through at least a portion of the corner regions adjacent to the trailing edge of the slider. The method also includes measuring the twist of the slider, and forming a first group of laser scribes on the back surface in one of the two sets of diagonally opposite corner regions, wherein each of the laser scribes intersects with one of the first and second mechanical scribes. The method also includes measuring the twist of the slider and comparing the values to the target value for twist, and forming additional laser scribes if the target value for twist is not reached.

25 Claims, 3 Drawing Sheets

U.S. PATENT DOCUMENTS

2002/0035778 A1 * 3/2002 Hashimoto et al. ...... 29/603.09
2002/0179861 A1 * 12/2002 Khlif .......................... 250/548
2003/0021067 A1 * 1/2003 Chang et al. ............. 360/234.3
2003/0029847 A1 * 2/2003 Khlif et al. ............ 219/121.65

OTHER PUBLICATIONS

Tam, A.C. et al. "Stress on the Dotted Line", from *Data Storage Technology & Manufacture of Storage Devices*, IBM Corp., Dec. 1999, pp. 29–38.

Tam, A.C. et al. "Research Report *New Laser Curvature Adjust Technique (LCAT) For Precise Adjustment of the Crown And Camber of Magnetic Head Sliders*", IBM, Corp., RJ 10158 (95033), Sep. 2, 1999, pp. 1–32.

Tam, A.C. et al. "New Laser Curvature Adjust Technique (LCAT) FOr Fine Adjustment of the Crown And Camber of Magnetic Head Sliders", Insight, May/Jun. 2000, pp. 8, 10–12.

* cited by examiner

ENHANCED TWIST ADJUST RANGE WITH SCRIBED LINES FOR SLIDER CURVATURE ADJUST

FIELD OF THE INVENTION

Embodiments of the present invention relate generally to disk drive systems and to the manufacture of slider devices used in the disk drive system. More particularly, certain embodiments relate to methods for controlling the adjustment of the curvature of sliders using scribing.

BACKGROUND

Magnetic storage systems typically include a rotatable magnetic disk having concentric data tracks defined for storing data, and a magnetic recording head or transducer for reading data from and writing data to the various data tracks. In typical disk drive systems, a stack of one or more magnetic disks is mounted over a spindle on a drive motor. The system also includes a head actuator for moving the magnetic recording head relative to the disk surfaces, and electronic circuitry for processing signals to implement various functions of the disk drive.

The head is attached to a carrier or slider having an air bearing surface which is supported during operation adjacent to the data surface of the disk by a cushion of air generated by the rotating disk. The terms "head" and "slider" are sometimes both used to refer to the slider having a head attached thereon. The slider design affects the efficiency, density, speed and accuracy with which the data can be read and written to the disk. Recording density generally depends on the separation distance (also known as the flying height) between the recording element of the head and the disk. Lower flying heights are usually desired to achieve high areal density recording. As flying height is reduced, it becomes increasingly difficult to maintain the flying height accuracy to the degree necessary for reliable reading and recording of data. In addition, lower flying heights can lead to undesirable interactions between the head and the disk.

The slider is typically fabricated from a hard ceramic material, and the disk typically includes a hard carbon coating. The slider material is chosen so that any interactions between the disk and air bearing surface of the slider will not result in premature wear or breakage of the slider. In addition, the slider material should be relatively inert so that no chemical reactions take place on the air bearing surface. As illustrated in FIG. 1, sliders are usually derived from a wafer 10 made from a ceramic material such as a mixture of aluminun oxide ($Al_2O_3$) and titanium carbide (TiC). The components of each read/write device are formed or deposited on a surface 12 of the wafer 10 and the wafer 10 is diced into rows such as row 20 illustrated in FIG. 2. The row 20 has an end surface 12 having the read/write device and a row face that is processed, usually by polishing and/or etching, to form an air bearing surface 18. The row 20 is then diced into individual sliders 30 having an air bearing surface 18 and a read/write device surface 12 on which the read/write device is typically located at a central position 32, as illustrated in FIG. 3. The end surface 12 of the slider at the position where the read/write device is located may also be known as the trailing edge. FIG. 4a illustrates a slider 30 having a leading edge 14, a trailing edge 12, an air bearing side 18, a back or flex side 22, and x and y directions. FIG. 4b illustrates a side view of the slider 30 from the y direction and shows a disk 40 over which the slider 30 flies.

The slider is often formed with an aerodynamic pattern of protrusions (air bearing pattern) on the air bearing surface which enable the slider to fly at a constant height close to the disk during operation of the disk drive. It has been found that several important characteristics of the slider related to obtaining the desired flying characteristics for the slider are crown, camber and twist. These characteristics relate to the curvature of the slider. Crown is the deviation from an imaginary planar surface in the direction of air flow (x-direction, or leading edge to trailing edge), with a concave air bearing surface shape defined as negative crown and a convex shape defined as positive crown. Similarly, camber is the deviation from the same imaginary planar surface in the y-direction (normal to the direction of air flow). A concave air bearing surface shape is defined as negative camber and a convex shape is defined as positive camber. Twist is the difference between the diagonal curvatures. The crown is the maximum spacing between the surface of back side 22 and the dotted line in FIG. 4b, which is along the x-direction. Similarly, the camber is the maximum spacing between the back surface and a dotted line along the y-direction, and the twist is the difference in diagonal curvatures. For typical slider designs, neither negative crown nor negative camber of the air bearing surface is desired because it leads to variations in the slider flying height and also makes it more likely that the edges and corners of the slider will damage the recording medium should there be contact between them. It should be understood that in the difference calculation for twist, a positive or a negative twist value is possible. The mathematical sign for the twist value therefore depends on the choice of the order of the two diagonal curvatures in the subtraction. Thus, a positive twist can be interpreted as a negative twist of the same magnitude if the order of the two diagonal curvatures in calculating their difference is reversed. An interpretation of the sign convention for twist, opposite to that described in this invention, should not limit the scope of embodiments of the present invention.

Adjusting any one parameter of the crown, camber and twist may lead to changes in the other parameters, as they all pertain to the same surface. It has been difficult to control these parameters because when an operation is carried out to control one parameter, the others may change in an unpredictable and undesirable manner.

SUMMARY

One embodiment relates to a method for adjusting the curvature of an air bearing surface of a slider, the slider including a leading edge, a trailing edge opposite the leading edge, and a back surface opposite the air bearing surface. The back surface includes a substantially rectangular shape having four corner areas including first and second corner areas adjacent to the trailing edge and third and fourth corner areas adjacent to the leading edge, wherein the first and third corner areas are diagonally opposite to one another and the second and fourth corner areas are diagonally opposite to one another. The method includes forming at least one mechanical scribe extending across at least a portion of at least one of said first and second corner areas. At least one laser scribe is formed intersecting and extending across said mechanical scribe line in one of the first or second corner areas. At least one mechanical scribe is formed extending across at least a portion of at least one of said third and fourth corner areas. At least one laser scribe is formed intersecting and extending across said mechanical scribe line in at least one of the third or fourth corner areas.

Another embodiment relates to a method for altering the curvature of a slider including an air bearing surface, a leading edge, a trailing edge opposite the leading edge, and a back surface opposite the air bearing surface. The method includes forming at least one mechanical scribe extending across at least a portion of the back surface, and forming at least one laser scribe intersecting and extending across at least one mechanical scribe.

Another embodiment relates to a method for adjusting the twist of an air bearing surface of at least one slider to substantially match a target value for twist. The slider includes a back surface opposite the air bearing surface, and the back surface includes two sets of diagonally opposite corner regions, with each set including one corner region adjacent to a leading edge of the slider and one corner region adjacent to a trailing edge of the slider. The method includes forming a first mechanical scribe on the back surface extending through at least a portion of the corner regions adjacent to the leading edge of the slider, and forming a second mechanical scribe on the back surface extending through at least a portion of the corner regions adjacent to the trailing edge of the slider. The method also includes measuring the twist of the slider. A first group of laser scribes is formed on the back surface in one of the two sets of diagonally opposite corner regions, wherein each of the first group of laser scribes intersects with one of the first and second mechanical scribes. The twist of the slider is measured and compared to the target value. Additional laser scribes are formed if the target value for twist is not reached.

Another embodiment relates to a slider including an air bearing surface, a leading edge adjacent to the air bearing surface, a trailing edge opposite the leading edge, and a back surface opposite the air bearing surface. The slider includes a first scribe extending in a direction substantially parallel to the trailing edge and a second scribe intersecting and extending across the first scribe. The first scribe and second scribe are located on the back surface of the slider.

BRIEF DESCRIPTION OF THE DRAWINGS

Embodiments of the invention are described with reference to the accompanying drawings which, for illustrative purposes, are schematic and not necessarily drawn to scale.

DETAILED DESCRIPTION

Figure 1:
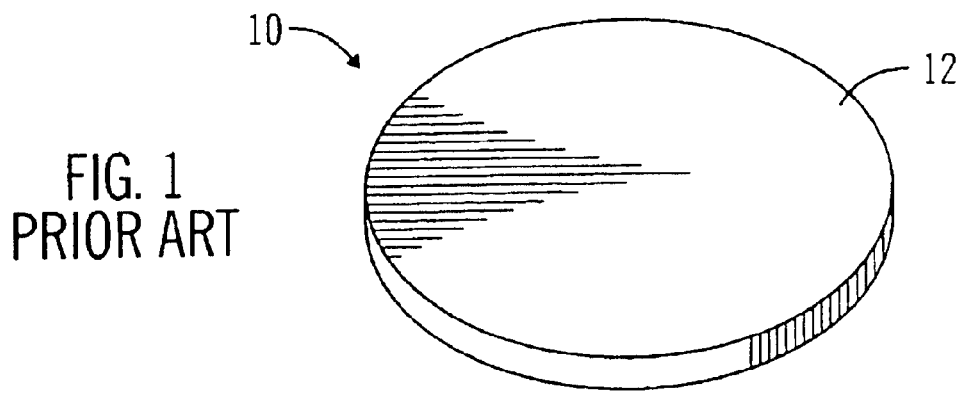
FIG. 1 is a perspective view of a wafer from which a plurality of sliders may be manufactured.
Figure 2:
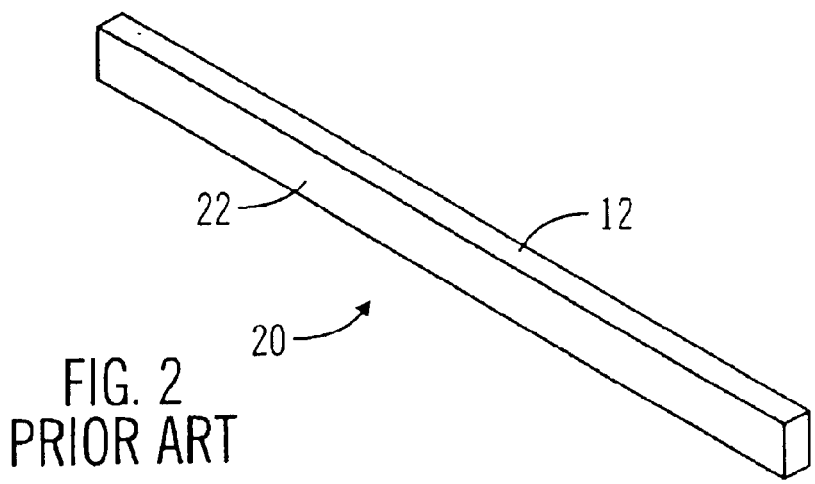
FIG. 2 is a perspective view of a row cut from the wafer of FIG. 1 during slider manufacturing.
Figure 3:
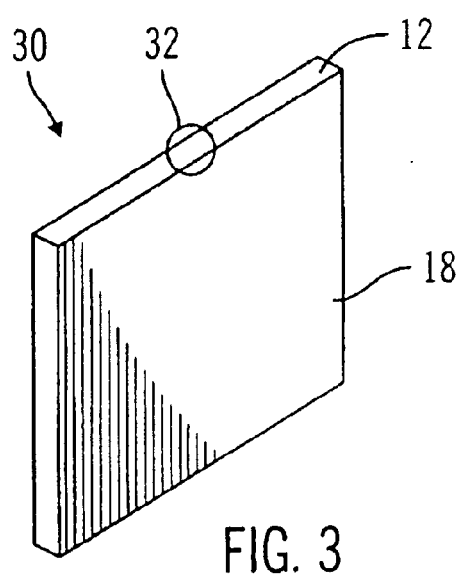
FIG. 3 is a perspective view of an individual slider component diced from the row of FIG. 2.
Figure 4A:
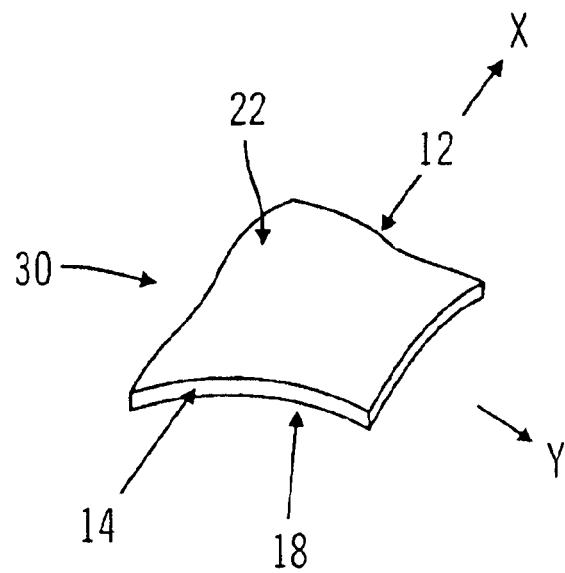
FIGS. 4a and 4b illustrate slider curve parameters and the relationship between a slider and a disk surface.
Figure 4B:
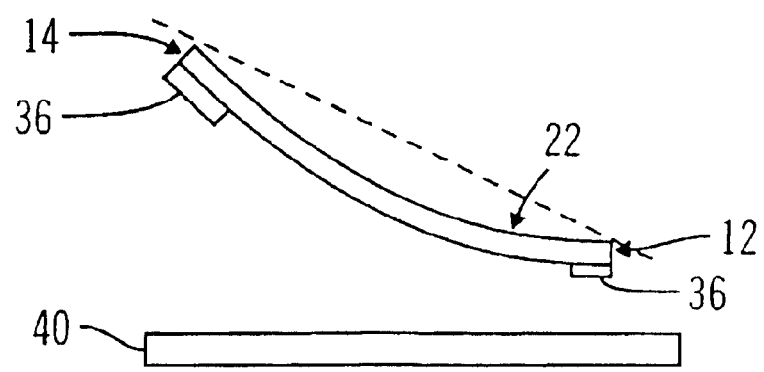

Preferred embodiments of the present invention are described with reference to FIGS. 5–6. While the invention is described in terms of the best mode for achieving this invention's objectives, it will be appreciated by those skilled in the art that variations may be accomplished in view of these teachings without deviating from the spirit or scope of the invention.

Certain preferred embodiments of the present invention provide methods for adjusting the three curvatures of a slider (twist, crown and camber) in a manner so that they reach desirable curvature values. It has previously been difficult to predictably adjust twist while having little effect on camber and crown. Co-pending U.S. patent application Ser. No. 09/916,851, entitled "Control of Twist, Crown and Camber for Sliders Using Location Sensitive Scribing," relates to adjusting slider curvature and is hereby incorporated by reference in its entirety. U.S. Pat. No. 6,631,548, entitled "Simultaneous Slider Crown and Camber Adjust By Scribe Line Control," also relates to adjusting slider curvature and is hereby incorporated by reference in its entirety.

Certain preferred embodiments utilize scribes in order to enhance the adjustable range of twist and to simultaneously adjust twist, crown and camber such that these curvature parameters may reach a desirable value. The term scribe may refer to scribes formed using a variety of methods. Both laser scribes and mechanical scribes are used in certain preferred embodiments. A preferred method for making the mechanical scribes is by use of a diamond scribe tool with which a scriber with a diamond tip is pressed onto the slider material. As the slider material translates, a scribe mark is made. When such a diamond tool is used to scribe, the terms "mechanical scribe" and "diamond scribe" are sometimes used to refer to the same type of scribe. It should be noted that there are a variety of other methods for forming mechanical scribes, including, for example, the use of metal and carbide tools. Method for making laser scribes may include, for example, the use of a pulsed-laser beam and the use of a continuous laser beam.

The actual enhancement of the twist range may depend on the slider material, the slider finish (e.g., the lapping process), the mechanical scribe parameters (e.g., scribe number, scribe force, scribe angle, scribe line location, etc.), and the laser scribe parameters (e.g., scribe number, scribe width, scribe line location, etc.). Therefore, it is difficult to strictly define the enhancement range. However, a twofold or greater enhancement compared to the case when mechanical scribes are not used and only laser scribes are used is possible in many embodiments.

In one aspect of certain embodiments, one or more mechanical scribes are formed on the back surface of a slider near the leading and trailing edges. U.S. application Ser. No. 09/277,862 is hereby incorporated by reference in entirety, and describes processing a slider surface after diamond scribing, so that its curvature can change upon subsequent laser scribing. In certain embodiments, after forming mechanical scribes and prior to forming laser scribes, the air bearing surface is lapped on a flat lapping plate before further processing (such as patterning/etching). This is because a mechanical scribe causes the scribed surface to bow and become convex in the direction of the scribe. This means if the back side is mechanically scribed, then the opposite side, i.e., the air bearing side, becomes concave. Laser scribing across the mechanical scribe releases at least some of the stress produced by the mechanical scribe and causes the scribed surface to become less convex, i.e., the opposite side, more convex. Therefore, lapping the air bearing surface after mechanical scribing to make it flat will result in a convex air bearing surface as the laser scribes are applied.

To adjust the twist, one or more pair of laser scribes are formed at diagonally opposite corner regions of the slider. Each time a laser scribe traverses a mechanical scribe, a certain amount of compressive stress is released and the slider curvature is modified. The amount of twist change each time a scribe pair is made is location dependent. Thus, by controlling the number of mechanical scribes, and the length, location and the number of laser scribes, twist adjust can be "metered". It is desirable in certain embodiments to have the laser scribes and mechanical scribes orthogonal to each other, This enables the laser scribes to cross the mechanical scribes without the need for additional critical alignment steps. However, it is possible to form laser scribes oblique to mechanical scribes and still provide twist changes.

Figure 6:
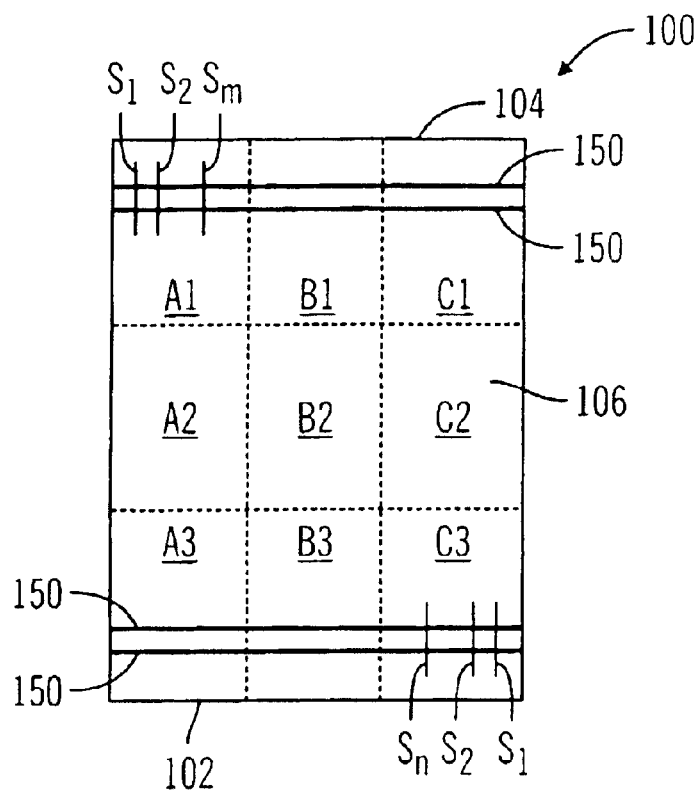
FIG. 6 illustrates scribe line designs on a slider according to an embodiment of the present invention.
Figure 5:
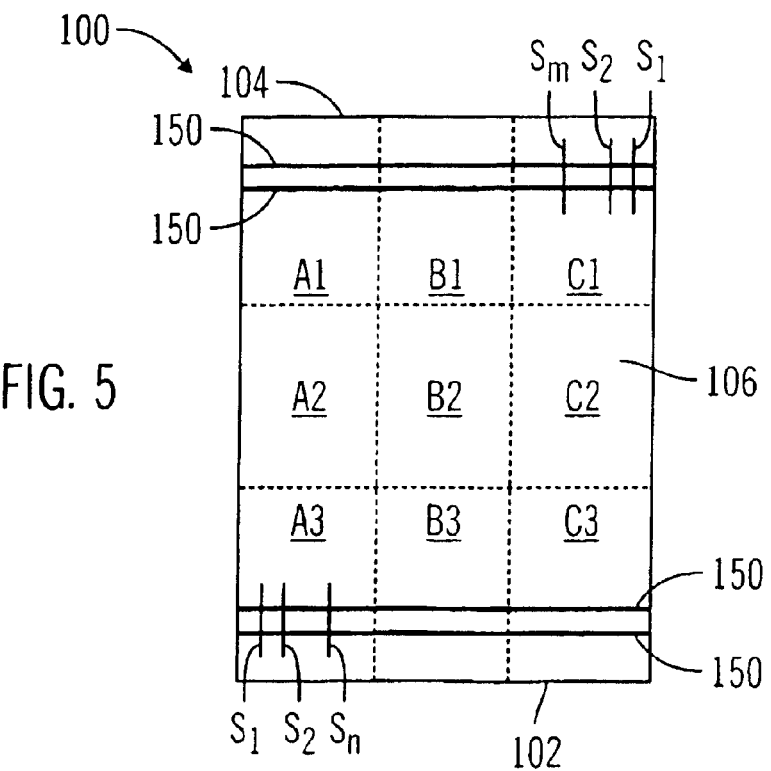
FIG. 5 illustrates scribe line designs on a slider according to an embodiment of the present invention.

FIGS. 5–6 illustrate laser scribe line designs according to certain preferred embodiments of the present invention. The back (flex) side 106 of a slider 100, including a leading edge 102 and trailing edge 104, may be divided into nine (3×3, including A1, B1, C1 on an upper region, A2, B2, C2 on a middle region, and A3, B3, C3 on a lower region) approximately equal imaginary cells as shown in FIGS. 5 and 6. Mechanically scribed lines 150 are formed to extend along the surface and as shown in FIGS. 5 and 6, may in certain embodiments extend in a direction substantially parallel to the leading edge 102 and trailing edge 104, and through cells A1, B1, C1 and A3, B3, C3. Laser scribed lines marked as $S_1, S_2 \ldots S_m$ and $S_1, S_2 \ldots S_n$ may in certain embodiments be located at diagonally opposite corner areas on the slider 100. The laser scribed lines, as illustrated in FIGS. 5 and 6, may extend through the mechanically scribed lines 150.

The diagonal layout of scribe lines marked as $S_1, S_2 \ldots S_m$ and $S_1, S_2 \ldots S_n$ in the upper right and lower left corner regions of the back side 106, as illustrated in FIG. 5, have been found to usually produce a positive twist change. The diagonal layout of the scribe lines in the upper left and lower right corner regions of the back side 106, as illustrated in FIG. 6, have been found to usually produce a negative twist change. In preferred embodiments, the number of scribe lines varies from 0 to 10, with n=m. The location of the mechanical scribe lines 150 near the leading edge 102 and trailing edge 104 of the slider 100 contributes to the enhanced twist adjust. If the mechanical scribe lines 150 are located too close to the mid-span of the slider 100, they will generally not provide a desired sensitivity to twist changes. While FIGS. 5 and 6 show two mechanical scribe lines 150 near both the leading edge 102 and trailing edge 104, more or less scribe lines may also be used. In addition, any number of laser scribe lines may be utilized as desired. As the number of scribe lines 150 is increased, however, throughput may be slowed.

Embodiments of the present invention permit twist to be adjusted in a positive or negative manner. While FIGS. 5 and 6 show scribes $S_1, S_2 \ldots S_m$ and $S_1, S_2 \ldots S_n$ made in one pair of corner regions, it is also possible to form the scribes in the other corner regions as well. For example, if too many scribes are made in one pair of corner regions and the twist is adjusted more than desired, it is possible to make additional scribes in the other pair of corner regions to modify the twist in the other direction.

It is preferred that the scribe lines 150 traverse the two most twist-sensitive cell pairs, namely, cell pair A1–C1 and A3–C3. For manufacturing efficiency, it may be desirable to form the scribe lines 150 to traverse the full slider width as shown in FIGS. 5 and 6. While FIGS. 5 and 6 divide the back side of a slider into an imaginary 3×3 arrangement of cells, the actual implementation of certain preferred embodiments is not necessarily limited to such an arrangement.

The steps of a two-installment process for metering twist according to one embodiment may be described as follows.

(1) Measure the curvature (twist, crown and camber) of the slider, preferably in situ.

(2) Obtain an estimate of the initial sensitivities for twist, crown and camber adjust (i.e., the curvature change per laser scribe).

(3) Determine if the twist should be adjusted "up" or "down" and choose the cells on which laser scribes will be applied. Calculate the number of laser scribes needed to reach the twist target for the first installment. For example, in one embodiment the percentage target may be 80% (e.g., reach 80% of the difference between the target twist value and the initial twist value).

(4) Form laser scribes to cross mechanical scribes (which are preferably formed prior to beginning the installment process) at opposite cell-pairs.

(5) Calculate the number of laser scribes needed to reach the crown and camber targets, and make a suitable percentage of each of the calculated scribe lines for the first installment. For example, in one embodiment, the percentage target for crown and camber may be 80%. Choose a laser scribe pattern, for example lateral, vertical or other patterned scribes which are located away from the laser scribe regions for twist adjust. This is the end of the first installment.

(6) Measure the curvature of the slider, and calculate the sensitivities for twist, crown and camber adjust from the measurements. As this embodiment is a 2-installment process, the percentage target for the second installment is 100%. Extrapolate from the data in the first installments to calculate how many additional laser scribes are needed for twist, crown and camber adjust to reach the target values. For twist, this may in certain situations be in the opposite direction from the previous installment.

(7) Form the laser scribes for twist, crown and camber according to the calculated number of scribes.

(8) Measure the final curvature. This is the end of the second installment.

The above steps describe an embodiment of a 2-installment process including up to 2 adjusts each for twist, crown and camber. Preferably three curvature measurements are made. A greater or smaller number of installments may be used in various embodiments, as desired. In addition, it may be desirable in certain embodiments to use a method similar to the above steps but adjust only one or two of the twist, crown and camber.

It is believed that scribing the opposite corner cells (A1 and C3 or A3 and C1 in FIGS. 5 and 6) appears to have a greater influence on twist than on camber and crown, while scribing closer to the center cell (B2 in FIGS. 5 and 6) appears to have a greater influence on camber and crown than on twist. In addition, lines scribed closest to the side edges of the back surface 106 of the slider 100 appear to have a greater influence on twist than other lines scribed closer to the center.

The scribes may take the form of lines and may have length that varies depending on the application, material, etc. In certain embodiments a laser scribe length such as, for example, 250–300 $\mu$m is desired. In addition, while the laser scribes may be formed about 20–100 $\mu$m apart, certain preferred embodiments have a much smaller spacing of up to about 20 $\mu$m, even more preferably up to about 10 $\mu$m apart. Other embodiments utilize laser scribe lengths of about 500 $\mu$m. In still other embodiments, shorter or longer lengths may be used. In addition, the laser scribes made for twist adjust, crown adjust and camber adjust may be different lengths and geometries. In addition, while scribe lines may be formed about 20–100 $\mu$m apart, certain preferred embodiments have a much smaller spacing of up to about 20 $\mu$m, even more preferably up to about 10 $\mu$m apart.

Measuring curvature and forming the laser scribes may be made using a variety of methods as known in the art. U.S. Pat. Nos. 6,075,604 and 6,108,170 describe certain method for measuring curvature and forming scribes and each is hereby incorporated by reference in its entirety. Scribes may be made using a variety of systems, including, but not limited to pulsed laser, continuous laser, diamond or other hard material tool, or other system that modifies the surface stress of the slider. In addition, the scribes may take a variety of forms including, but not limited to a continuous line, a dotted line, a series of line segments, or curved path along the slider surface.

It will, of course, be understood that modifications of the present invention, in its various aspects, will be apparent to those skilled in the art. For example, while mechanical scribes and laser scribes may be used as discussed above, other types of scribes and/or methods of influencing surface stresses may also be applied to embodiments of the present invention. In addition, embodiments may be applicable to individual sliders and/or sliders attached together in rows. Additional embodiments are possible, their specific features depending upon the particular application.

What is claimed:

1. A method for adjusting the curvature of an air bearing surface of a slider, the slider including a leading edge, a trailing edge opposite the leading edge, and a back surface opposite the air bearing surface, the back surface including a substantially rectangular shape having four corner areas including first and second corner areas adjacent to the trailing edge and third and fourth corner areas adjacent to the leading edge, wherein the first and third corner areas are diagonally opposite to one another and the second and fourth corner areas are diagonally opposite to one another, the method comprising:
   forming at least one mechanical scribe extending across at least a portion of at least one of the first and second corner areas;
   forming at least one laser scribe intersecting and extending across the mechanical scribe in one of the first or second corner areas;
   forming at least one mechanical scribe extending across at least a portion of at least one of the third and fourth corner areas; and
   forming at least one laser scribe intersecting and extending across the mechanical scribe in at least one of the third or fourth corner areas;
   wherein the laser scribes are formed substantially perpendicular to the mechanical scribes.

2. A method as in claim 1, wherein the laser scribes are substantially parallel to one another.

3. A method as in claim 1, wherein at least one scribe is formed as a series of line segments.

4. A method as in claim 1, further comprising forming the at least one mechanical scribe extending across at least a portion of at least one of the first and second corner areas to also extend in a direction that is substantially parallel to the trailing edge, and forming the at least one mechanical scribe extending across at least a portion of at least one of the third and fourth corner areas to also extend in a direction that is substantially parallel to the leading edge.

5. A method as in claim 1, further comprising forming the laser scribes in one set of opposite corner areas selected from the group consisting of the first and third corner areas and the second and fourth corner areas.

6. A method for adjusting the twist of an air bearing surface of at least one slider to substantially match a target value for twist, the at least one slider having a back surface opposite the air bearing surface, the back surface including two sets of diagonally opposite corner regions, with each set including one corner region adjacent to a leading edge of the slider and one corner region adjacent to a trailing edge of the slider, the method comprising:
   forming a first mechanical scribe on the back surface extending through at least a portion of the corner regions adjacent to the leading edge of the slider;
   forming a second mechanical scribe on the back surface extending through at least a portion of the corner regions adjacent to the trailing edge of the slider;
   measuring the twist of the slider;
   forming a first group of laser scribes on the back surface in one of the two sets of diagonally opposite corner regions, wherein each of the first group of laser scribes intersects with one of the first and second mechanical scribes;
   measuring the twist of the slider and comparing the values to the target value for twist; and
   forming additional laser scribes if the target value for twist is not reached;
   wherein the first group of laser scribes are formed in a direction substantially perpendicular to the mechanical scribes.

7. A method as in claim 6, wherein the mechanical scribes are formed in a direction substantially parallel to the leading edge.

8. A method as in claim 4, further comprising forming third and fourth mechanical scribes on the back surface, wherein the third mechanical scribe is located adjacent to the first mechanical scribe and the fourth mechanical scribe is located adjacent to the second mechanical scribe, and wherein each of the first group of laser scribes intersects with the first and third mechanical scribes or the second and fourth mechanical scribes.

9. A method as in claim 6, wherein the third and fourth mechanical scribes are formed substantially parallel to the first and second mechanical scribes.

10. A method as in claim 6, further comprising forming the first group of laser scribes so that adjacent scribes are up to 10 $\mu$m apart from each other.

11. A method as in claim 6, further comprising forming the first group of laser scribes so that adjacent scribes are 20 $\mu$m to 100 $\mu$m apart from each other.

12. A method as in claim 11, further comprising forming the first group of laser scribes to have a length in the range of 250 $\mu$m to 300 $\mu$m.

13. A method for adjusting the twist of an air bearing surface of at least one slider to substantially match a target value for twist, the at least one slider having a back surface opposite the air bearing surface, the back surface including two sets of diagonally opposite corner regions, with each set including one corner region adjacent to a leading edge of the slider and one corner region adjacent to a trailing edge of the slider, the method comprising:
   forming a first mechanical scribe on the back surface extending through at least a portion of the corner regions adjacent to the leading edge of the slider;
   forming a second mechanical scribe on the back surface extending through at least a portion of the corner regions adjacent to the trailing edge of the slider;
   measuring the twist of the slider;
   forming first group of laser scribes on the back surface in one of the two sets of diagonally opposite corner regions, wherein each of the first group of laser scribes intersects with one of the first and second mechanical scribes;

measuring the twist of the slider and comparing the values to the target value for twist;

forming additional laser scribes if the target value for twist is not reached; and forming crown and camber adjustment scribes on the back surface located a distance away from the first group of laser scribes.

14. A method as in claim 13, wherein the first group of laser scribes are formed to extends across the first mechanical scribe at an oblique angle.

15. A method as in claim 13, wherein the first group of laser scribes are formed to extends across the first mechanical scribe at an orthogonal angle.

16. A method as in claim 13, wherein the mechanical scribes are formed in a direction substantially parallel to the leading edge.

17. A method as in claim 13, further comprising forming third and fourth mechanical scribes on the back surface, wherein the third mechanical scribe is located adjacent to the first mechanical scribe and the fourth mechanical scribe is located adjacent to the second mechanical scribe, and wherein each of the first group of laser scribes intersects with the first and third mechanical scribes or the second and fourth mechanical scribes.

18. A method as in claim 17, wherein the third and fourth mechanical scribes are formed substantially parallel to the first and second mechanical scribes.

19. A method as in claim 13, further comprising lapping the air bearing surface after forming the second mechanical scribe on the back surface and prior to forming the first group of laser scribes on the back surface.

20. A method as in claim 13, further comprising forming the first group of laser scribes so that adjacent scribes are up to 10 $\mu$m apart from each other.

21. A method as in claim 13, further comprising forming the first group of laser scribes so that adjacent scribes are 20 $\mu$m to 100 $\mu$m apart from each other.

22. A method as in claim 13, further comprising forming the first group of laser scribes to have a length in the range of 250 $\mu$m to 300 $\mu$m.

23. A method for altering the curvature of a slider including an air bearing surface, a leading edge, a trailing edge opposite the leading edge, and a back surface opposite the air bearing surface, comprising:

forming at least one mechanical scribe extending across at least a portion of the back surface; and forming at least one laser scribe intersecting and extending across at least one mechanical scribe, wherein the at least one laser scribe is formed at an angle that is orthogonal to the at least one mechanical scribe.

24. A method as in claim 23, further comprising forming two mechanical scribes adjacent to the leading edge and two mechanical scribes adjacent to the trailing edge.

25. A method as in claim 23, further comprising forming the at least one mechanical scribe to be substantially parallel to the leading edge and the trailing edge of the slider.

* * * * *